United States Patent [19]
Felsenstein

[11] Patent Number: 5,450,596
[45] Date of Patent: Sep. 12, 1995

[54] CD-ROM DATA RETRIEVAL SYSTEM USING A HANDS-FREE COMMAND CONTROLLER AND HEADWEAR MONITOR

[75] Inventor: Lee Felsenstein, Berkeley, Calif.

[73] Assignee: RedWear Interactive Inc., New York, N.Y.

[21] Appl. No.: 732,047

[22] Filed: Jul. 18, 1991

[51] Int. Cl.⁶ .......... G06F 3/05; G06F 3/14; G06F 9/06; G06F 15/44

[52] U.S. Cl. .......... 395/800; 364/231.1; 364/231.2; 364/231.3; 364/237.2; 364/237.5; 364/237.81; 364/237.9; 364/245.8; 364/245.6; 364/708.1; 364/DIG. 1; 364/DIG. 2; 345/8

[58] Field of Search .......... 395/800, 11, 250, 200, 395/275, 325, 400, 425, 500, 550, 600, 650, 700, 725, 775, 750; 364/405, DIG. 1, DIG. 2, 708.1, 709.1, 709.2, 709.11; 340/705, 706, 711; 358/88; 345/8, 163; 348/838

[56] References Cited

U.S. PATENT DOCUMENTS

| | | | |
|---|---|---|---|
| 4,257,306 | 3/1981 | Laflamme | 340/711 |
| 4,310,849 | 1/1982 | Glass | 358/88 |
| 4,559,555 | 12/1985 | Schoolman | 358/88 |
| 4,636,866 | 1/1987 | Hattori | 340/705 |
| 4,639,225 | 1/1987 | Washizuka | 348/838 |
| 4,706,117 | 1/1987 | Schoolman | 358/88 |
| 4,737,972 | 4/1988 | Schoolman | 345/8 |
| 4,905,001 | 2/1990 | Penner | 340/407 |
| 4,931,950 | 6/1990 | Isle et al. | 395/11 |
| 4,994,987 | 2/1991 | Baldwin | 434/305 |
| 5,003,300 | 3/1991 | Wells | 345/8 |
| 5,052,504 | 10/1991 | Ikeda et al. | 364/405 |
| 5,129,776 | 7/1992 | Holakovszki et al. | 358/88 |
| 5,148,155 | 9/1992 | Martin et al. | 340/706 |
| 5,175,534 | 12/1992 | Thatcher | 340/706 |
| 5,281,957 | 1/1994 | Schoolman | 345/8 |
| 5,285,398 | 2/1994 | Janik | 364/708.1 |
| 5,305,244 | 4/1994 | Newman et al. | 364/708.1 |

*Primary Examiner*—Alyssa H. Bowler
*Assistant Examiner*—Daniel H. Pan
*Attorney, Agent, or Firm*—Gottlieb, Rackman & Reisman

[57] ABSTRACT

A video display attached to a lightweight headpiece and using a zero motion mouse for the input of commands. The system accesses data from a CD-ROM reader and can store user generated data to a memory card for later retrieval. It is light enough to be worn by the user and does not interfere with the use of the user's hands.

8 Claims, 3 Drawing Sheets

CD-ROM DATA RETRIEVAL SYSTEM USING A HANDS-FREE COMMAND CONTROLLER AND HEADWEAR MONITOR

This invention relates to data retrieval systems for accessing and displaying digitized data. More particularly, it relates to such system for hands-free operation where the user is able to retrieve data with minimal inconvenience. By hands-free is meant a unit that permits the user to operate it without having to set the unit up on a table or hold it thereby tying up the user's hands as a support for the viewing unit.

BACKGROUND OF THE INVENTION

Sales personnel and others dealing with customers often have to meet the conflicting requirements of mobility and ready access to detailed information concerning inventory. For example, a salesman for replacement parts might have to travel to customer locations and be prepared with detailed information on product specifications and pricing. Since most of this information is currently kept on computer databases and is frequently updated, there has long been a need for a convenient data retrieval system, preferably one that displays images and perhaps, in the interest of convenience, is capable of speaking to the user in an ordinary language. Further, there is a need for a simple mechanism by which the sales person, may at the same time, record orders or other related information to be input into the database maintained at company headquarters. With the advent of laptop and notebook computers capable of running standard database programs, it is now possible for a trained user to access a database in the field in order to read or record relevant data. However, such machines are relatively expensive, have non-essential capabilities needed for more general programs, are not adapted for speech decoding and require a high level of training by the user. Furthermore, they require the use of both hands by the user and typically a desk top or other surface to hold the apparatus. What is required is an essentially hands-free system for data retrieval and recording that is relatively inexpensive and easy to use, yet has the ability to display virtually any form of data.

This problem has not been specifically addressed in the prior art, but some devices have provided partial and relatively inadequate alternatives to the present invention.

U.S. Pat. No. 4,639,225 disclosed a portable TV having a TV housing with a screen large enough to display a real image and a 15 button keypad. In addition to receiving broadcast transmissions, the TV accepted semi-conductor ROM memory units that could include audio as well as video information to be displayed on the TV screen. The types of displays that were described were electronic games, which typically have crude graphics with a relatively small amount of pixel and acoustic data. Because of the specialized expected use of the device, the information was displayed only sequentially from each memory unit. Indeed, it was suggested that an external output device such as a cassette tape recorder could be used as the memory means. It was assumed that the memory unit could also store speech, but in the form of a TV broadcast signal accompanying the display information. Commands from the user were entered by the keypad on the front of the TV chassis. The device was essentially a television display apparatus and lacked any concept of accessing information in a manner that would leave the user free of burdensome screen displays or input devices, nor was there any way for the user to record data. Further, there was no implementation of a manner of utilizing the information capacity and random access capability of CD-ROM devices.

U.S. Pat. No. 4,257,306 disclosed a small dedicated lightweight device that could visually illustrate extremely limited information in response to queries input from a keypad. In this case, the query was restricted to the names of acoustical chords and the display, essentially a small number of on/off lights, showed only the guitar fingering needed to play the chord. This was a single use apparatus with no adaptability for display of generalized information and no mechanism for recording information in the field.

U.S. Pat. No. 4,994,987 disclosed a system for randomly accessing stored images, including engineering drawings. However, the device disclosed in that patent was intended for the purpose of organizing a series of images for presentation to a large group of individuals. It required creation of an image access document for each image that is going to be accessed and does not accomplish the reduction of the size or the difficulty or displaying the information in a hands-free manner. Since it was an audience display device, it required a large real image such as by projection.

The Sony Corporation has announced in Japan a palm-size CD-ROM reader for 3.2 inch disks, which is battery powered and includes a 2½ inch LCD screen. There is also a video output port that allows connection to a TV set or video player for larger displays. There are no PC input or output ports. Again, this device is not suitable for hands-free operation, nor for recording additional information.

BRIEF DESCRIPTION OF THE INVENTION

The present invention meets the requirement stated above by providing a light, portable hands-off data retrieval and recording system. The system comprises a display system having an earphone and a video display that attaches to a lightweight headpiece. The user looks through an eyepiece to view a virtual image that appears in front of the eyepiece, creating the illusion of a high-resolution computer screen floating in front of the user. The user sees an image that contains a cursor whose movement is controlled by a command control device comprising an isometric or force operated "zero-motion mouse" which causes the cursor to respond to slight motions of the user's thumb. Selection of data under the cursor is made by depressing the thumb, thereby leaving the hand relatively free.

The display system and command control are connected to a very lightweight computer that accesses data from a CD-ROM drive and stores user responses on a memory card. This allows the user at appropriate times to update the data by exchanging CD-ROM disks and to provide responses to the home office by delivering the memory card. Furthermore, the cursor control and display software may be changed, from time to time, by re-programming a portion of the memory card.

DETAILED DESCRIPTION OF A PREFERRED EMBODIMENT

Figure 1:
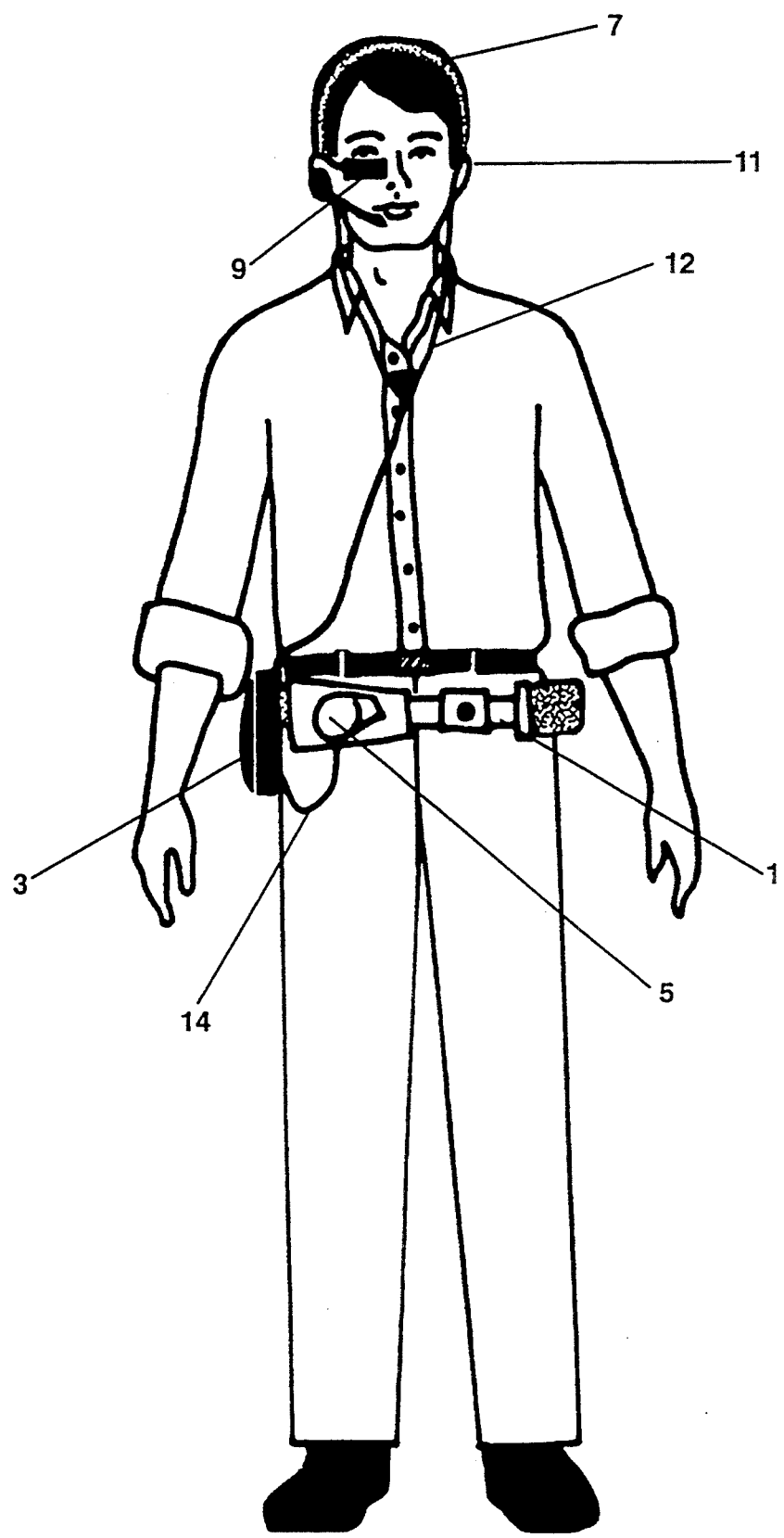
FIG. 1 is a drawing of a user wearing the system of the present invention.

The information retrieval system of the present invention is shown in a preferred embodiment in FIG. 1. The user wears a belt 1 holding a carrying case 3, a command control device 5 worn on one hand and a headset 7 which may be worn under the user's headgear (not shown). The headset 7 supports a head mounted image display device 9 and one or more earphones 11. The apparatus is designed to impede the physical movement of the user as little as possible and therefore is constructed of light weight materials and thin wire connectors. Electrical connections 12 and 14 extend from the headset 7 and command control device 5 to the carrying case 3.

Figure 2:
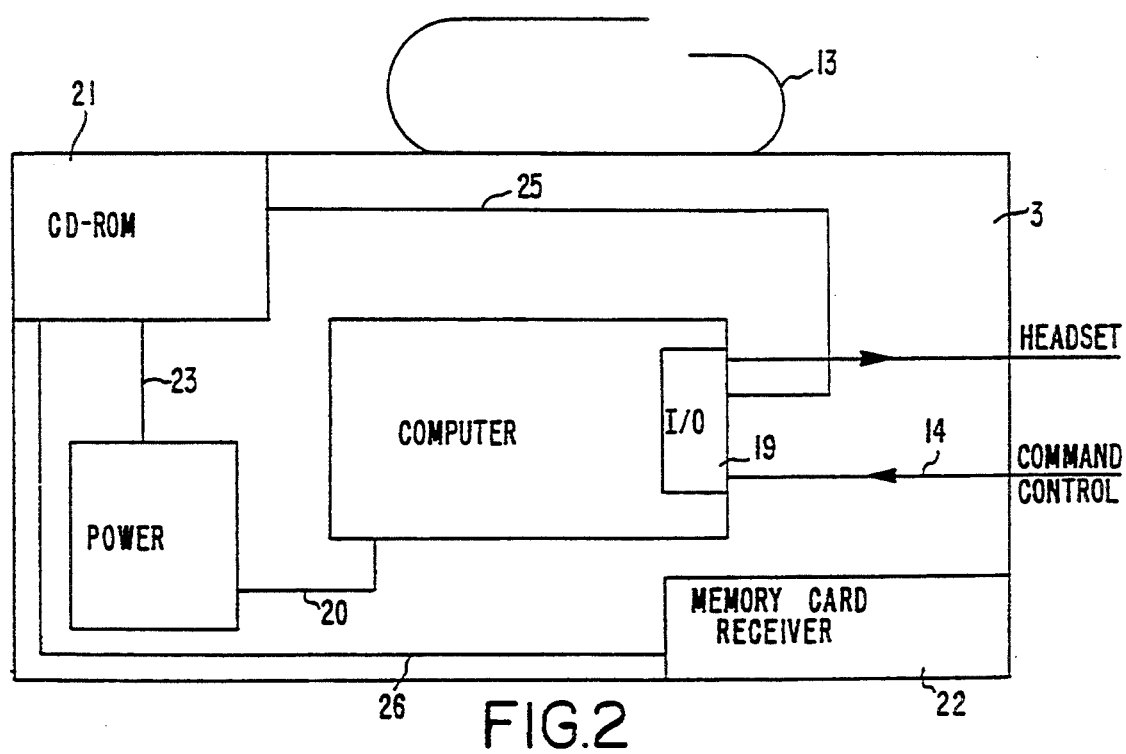
FIG. 2 is a schematic drawing of the components of the carrying case in the preferred embodiment of the invention.

As shown in FIG. 2, the carrying case 3 contains a clip or velcro belt attachment 13 and encloses a power supply 15, preferably a battery, supplying d.c. power to a computer 17 having a CPU, RAM and ROM memory and I/O ports 19. The I/O ports interface with the connector 14 for receiving input from the command control device 5 and interface with the connector 12 for providing output to the image display device 9 and earphone 11. The computer receives power via connector 20 from power supply 15. Also contained within the carrying case 3 is a CD-ROM delivery drive 21, and a memory card receiver 22 both receiving power via connectors 23 and 24. The CD ROM delivery device and memory card receiver are connected by data buses 25 and 26 to the input ports 19.

The CD-ROM delivery drive accepts digitized data on 5¼ inch compact discs, rotating at 300 r.p.m. An alternative to the CD-ROM could be any memory medium, for example, EPROMs that could be read by computerized means, such as a ROM reader or a second memory card. The critical characteristics are that the memory medium be replaceable (to allow the user to input different data) and that it be lightweight and compact.

Figure 3:
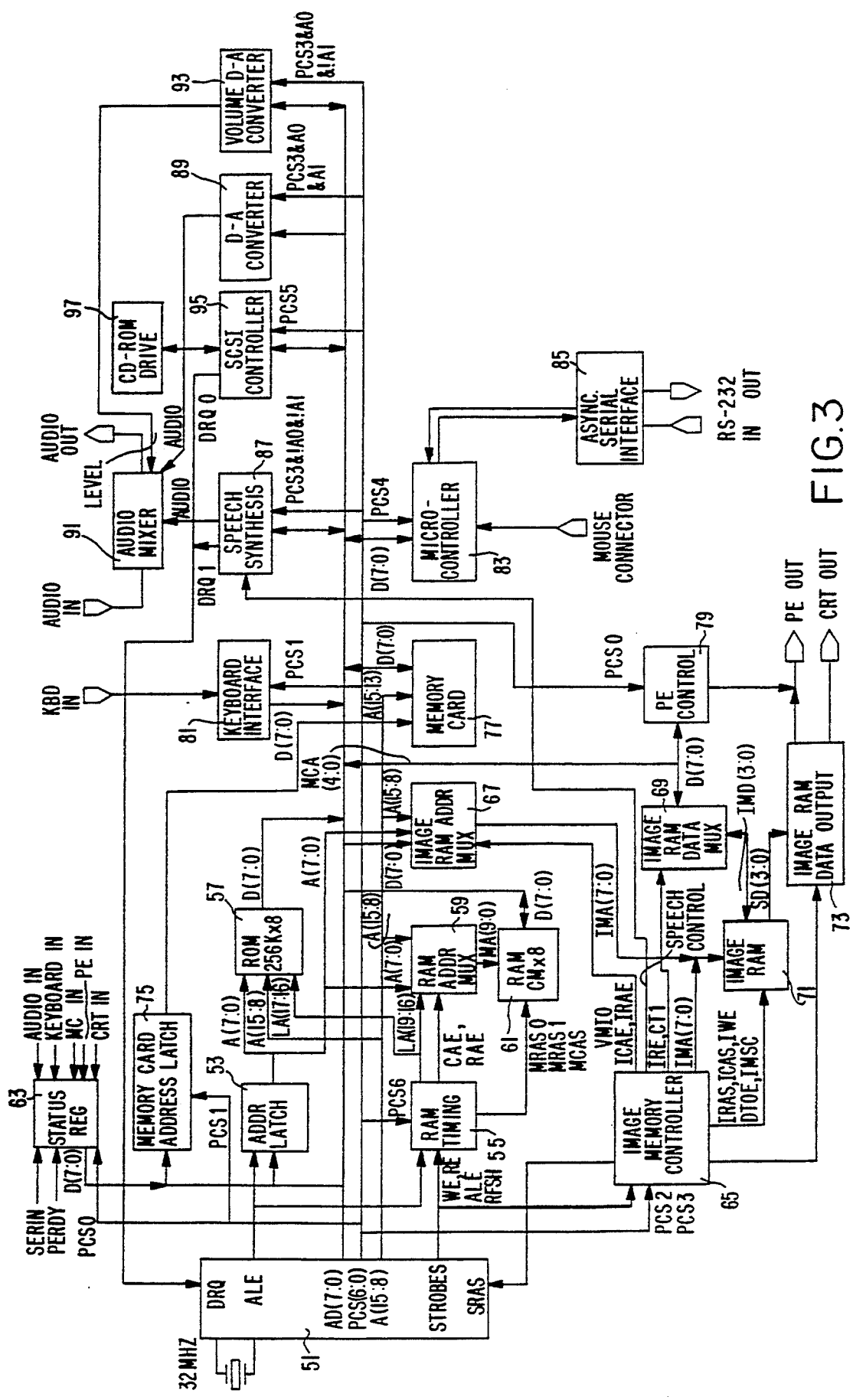
FIG. 3 is a schematic drawing of the components of the computer of the present invention.

The arrangement of the components is shown schematically in FIG. 3. Referring to that figure, microprocessor 51 is preferably an Intel 80C186 or 80C188 type microprocessor, which has a 16-bit internal data bus and a self-contained interrupt controller, DMA controller, 3-channel counter/timer, and an internal peripheral chip select decoder. The microprocessor 51 generates a 16-bit address bus multiplexed with 8 or 16 bit bidirectional data lines. FIG. 3 shows an 8-bit data version (80C188), with AD(7) through AD(O) being multiplexed data and address bits 7 through 0 respectively. The trailing edge of address latch signal ALE indicates stability of the address signals. The microprocessor 51 also generates write-enable strobe signal WE, read-enable strobe signal RE, and refresh enable signal RFSH, along with decoded Peripheral Chip Select signals PCS(O) through PCS(6). The operation of the microprocessor 51 is synchronized by the SRDY signal, which extends the operation of the bus data exchange cycle during the time that SRDY is held low. This enables the external circuitry to delay the completion of a data transfer operation to or from the microprocessor until the external circuitry has completed its operation.

The address latch 53 comprises an eight bit (sixteen bits wide for 80C186 version) transparent latch gated by the ALE address latch signal. It holds signals present at its inputs at the trailing edge of ALE. The address latch 53 outputs comprise address signals A(7) through A(O).

The program RAM timer 55 generates row address strobe signal MRAS, column address strobe signal MCAS, row address enable signal MRAE, and column address enable signal MCAE in correct timing relationship to permit operation of dynamic random access memory (DRAM) 61. The program RAM timer 55 latches address signals A(19) through A(16) with the trailing edge of ALE signal to produce latched address signals LA(19) through LA(16) in a manner analogous to address latch 2. For one preselected set of values of latched signals A(19) through A(16) the outputs LA(19) through LA(16) are replaced by the contents of a four-bit-wide latch. The contents of this latch are determined by the low order four data bits AD(3) through AD(O) present during the peripheral select signal PCS(6). This maps different portions of the DRAM as selected by the value latched into the internal latch to respond within the preselected address range and to fail to respond within ranges of addresses which would otherwise conflict with Read-Only Memory (4).

Read-Only Memory (ROM) 57 is a static read-only memory which responds to addresses A(19) through A(O) by presenting stored data to the data lines AD(7) through AD(O). It is used for the storage of fixed programs and data.

The program RAM address multiplexer 59 presents ten bits of address signals LA(19) through LA(16) and A(15) through A(O) under control of row-address enable signal RAE to program DRAM memory address lines MA(9) through MA(O). It presents the remaining ten bits of address signals under control of column address enable signal CAE to aforementioned program DRAM memory address lines MA(9) through MA(O).

Program RAM 61 is a Dynamic Random Access Memory (DRAM) having address signals driven by lines MA(9) through MA(O), data signals driven by data lines AD(7) through AD(O), row-address strobe driven by signal MRAS, column address strobe driven by MCAS, and write-enable signal driven by write strobe WE. It operates at an access time of 120 nanoseconds.

Status Register 63 is an eight bit data buffer which drives the data from its inputs onto the data signals AD(7) through AD(O) under command of peripheral chip select signal PCS(O). The inputs are connected to signals which respond to the insertion of various connectors into their designated sockets, indicating that various peripheral devices are connected. Through this means the program may respond to different configurations of externally connected devices.

Image memory manipulation is provided by Image Memory Controller 65, Image Memory Address Multiplexer 67, Image Memory Data Multiplexer 69, Image Memory 71, and Image Memory Data Output 73.

Memory Card Address Latch 75 is a five-bit latch which latches data from the low-order five bits of the data bus AD(4) through AD(O) under control of write enable WE during peripheral chip select PCS(1). It generates five high-order bits of the address to memory card 77 and allows for the selection by the program of the 64 Kbyte block of memory within the memory card which will appear to the microprocessor when it is addressed.

The memory card 77 is a removable card containing from 64 Kbytes to 1 Mbyte of nonvolatile memory, generally static RAM with integral battery backup power. Preferably it meets the PCMCIA memory card specification and has eight or sixteen data bits, 20 address bits, read-enable RE signal, and memory chip select MCS2 from the microprocessor 51.

The video output is controlled by Virtual Display Control 79.

The keyboard interface 81 receives signals from the zero motion mouse, generates an interrupt signal when a character is received, resets the interrupt and places the received data on a data bus AD(7) through AD(O) upon read command during peripheral chip select PCS1.

The Micro-Controller 83 is a single-chip integrated microprocessor having 4K internal ROM, 256 bytes of RAM, four analog inputs and internal asynchronous serial receiver-transmitter. It connects to data signals AD(7) through AD(O) and responds to read-enable signal RE or write-enable signal WE during peripheral chip select signal PCS(4). One output bit is connected to the microprocessor interrupt-request line IRQ3. The program resident in the microcontroller is written to handle analog data generated by the joystick input and to convert such x/y analog signals into sequences of data which mimic the data transmitted by a serial mouse. In addition, the microcontroller program manages data transfers to and from the internal serial receiver-transmitter under command of the microprocessor's program.

The asynchronous serial interface 85 comprises level translators which interface between the internal circuitry of the microcontroller and external the asynchronous serial data lines such as those conforming to RS-232 or RS449, to provide an alternative for down loading information from the system.

The speech synthesizer 87 comprises an integrated microcontroller such as a Texas Instrument 50C10 having internal ROM and RAM and capable of generating a pulse width-modulated analog output. This chip simulates the human vocal tract and operates under control of software run by the microprocessor when speech is required. The synthesizer chip is loaded with data under control either of the main program or of an interrupt generated by the timer within the microprocessor. The clock input is a 10.66 Mhz signal generated by dividing the 16 Mhz system clock by a modulus of 1.5. Data are written to and read from the synthesizer chip 87 under control of the conjunction of the peripheral chip select signal PCS3 and the negation of address signals A(O) and A(1). The direction of data transfer is controlled by data direction signal DTR generated by the microprocessor.

Audio Digital-to-Analog Converter 89 is an eight bit digital-to-analog converter containing internal data latch which accepts data from an external latch. The external latch is loaded with data from data signals AD(7) through AD(O) under command of the write enable signal WE during the conjunction of peripheral chip select signal PCS3 and address bits A(O) and A(1). The digital-to-analog converter 89 includes circuitry to divide the 16 Mhz system clock by 2,048 to produce a signal at 8,192 Hz which causes the transfer of data from the external latch to the internal latch and simultaneously sets a DMA request signal DRQ1. This signal initiates a direct memory access transfer in accordance with parameters which are stored into registers within the DMA controller section of the microprocessor. The analog output of the audio digital-to-analog converter is fed to the audio mixer and amplifier 91.

The Volume Digital-to-Analog Converter 93 comprises five bit CMOS latch, the outputs of which drive a network of resistors so as to produce a voltage which can take 32 possible levels in response to the different values which can be entered into the latch. Data are entered under command from data signals AD(7) through AD(2) under command of write enable signal WE during the conjunction of peripheral chip select signal PCS3 and address signals A(O) and the inverse of A(1). The analog output of this circuit is fed to the audio mixer and amplifier circuit where it is used to control the level of the amplification.

The Audio Mixer and Amplifier 91 comprises an analog circuitry comprised of LM324 operational amplifiers, a four-pole Butterworth filter and a MC3340 volume-control amplifier. The output of the audio digital-to-analog converter is mixed through the summing junction of a stage of an LM324 operational amplifier with audio from the analog output of the speech synthesizer, and the resulting output is fed through a four-pole Butterworth filter which is realized by a switched-capacitor filter of the TIL04 type. The clock input of the filter is driven by a 516 Khz signal generated by dividing the 10.66 Mhz clock of the speech synthesizer by a modulus of 20.

Disc Controller 95 is a single-chip integrated controller which accepts commands from the microprocessor through data lines AD(7) through AD(O) under command of write enable signal WE during peripheral chip select signal PCS5 and which performs control sequence operations which command the operation of the CD-ROM disc drive 97. Commands include seek-to-sector, read sector, and recalibrate. Status data and data read from the selected sectors are transferred through the controller and are read by read enable signal RE during peripheral chip select signal PCS5.

The CD-ROM Disc Drive 97 is a portable disc drive similar to audio compact disc drive having modifications of electronics so as to perform higher levels of error correction required for data transfer and including interface circuitry capable of responding to control sequence commands generated by the disc controller chip. Optical storage techniques allow the storage of over 600 Mbytes of data on a 5 inch diameter disk.

The preferred viewer is Model P4 available from Reflection Technology of Waltham, Mass. It comprises a 720×280 pixel resolution that corresponds to 80 text characters by 25 lines with 9×11 font. The image is equivalent to viewing a 9.3"×6" (12" diagonal) screen at 24". The location of the user's eye in order to view the full image is 20 mm from the viewing window. The headset and display occupy a space less than 1.5" high for storing and weighs 3¾ ounce with cable.

The preferred text to speech converter is available from Berkeley Speech Technologies of Berkeley, Calif. and converts ASCII text to speech. The preferred zero motion mouse includes a small ball which is slightly rotated by motion of the user's thumb. The mechanism of controlling the motion of a cursor by the application of such a device is described in the present inventor's U.S. Pat. No. 5,012,231, entitled "Method and Apparatus for Cursor Motion Having Variable Response".

Although the system has been described in terms of a preferred embodiment it should be understood that the full scope of the invention is determined only by the proper interpretation of the following claims.

I claim:

1. A user wearable information retrieval system for displaying predetermined digitized data encoded into a large capacity information storage device such as a compact disk comprising:
    a carrying case enclosing a power supply, a computer having I/O port means, and
    a CD-ROM delivery drive interfaced with said I/O port means adapted to receive a memory medium containing said predetermined digitized data, said delivery drive being adapted to access the data on said memory medium and to provide said data to said I/O port means,
    a virtually hands-free command control device presenting no interference to ordinary use of the hands of the user to provide input commands from the user to said computer via said I/O port means, and
    a headset adapted to be worn by said user and a head mounted image display supported by said headset comprising
        virtual image display means comprising an eyepiece adapted to be positioned in front of one eye of the user and to display video display information from said computer.

2. The information retrieval system of claim 1 wherein said command control device comprises isometric (force-operated) controller means adapted to receive input from the user's finger pressure.

3. The information retrieval system of claim 1 wherein said headset further comprises an audio output means comprising an earphone, and
    a real-time text to speech conversion means adapted to receive speech data from said computer and to provide audio input to a sound transducer in said earphone.

4. The information retrieval system of claim 1 wherein said carrying case further contains a memory card receiver adapted to read from and write to a memory card information transmitted via said I/O port means.

5. The information retrieval system of claim 4 wherein said command control device comprises isometric (force-operated) controller means adapted to receive input from the user's finger pressure.

6. The information retrieval system of claim 4 wherein said headset further comprises an audio output means comprising earphones, and
    a real-time text to speech conversion means adapted to receive speech data from said computer and to provide audio input to a sound transducer in said earphone.

7. A portable, user wearable, lightweight information retrieval system adapted to be worn by a user for displaying predetermined digitized data encoded into a large capacity information storage device such as a compact disk comprising
    a carrying case comprising a belt attachment enclosing
        a power supply, a computer on a circuit card comprising a CPU, a ROM memory and I/O port means, and
        a CD-ROM delivery drive electrically connected to receive power from said power supply and adapted to receive a memory medium containing said predetermined digitized data, said delivery drive being adapted to access the data on said memory medium and to provide said data to said I/O port means,
    a virtually hands-free command control device providing the user with the capability of having complete freedom of movement and use of hands without interfering with the operation of the system and to provide input commands to said computer via said I/O port means,
    a headset adapted to be worn by said user under headgear and a head mounted image display supported by said headset comprising
        virtual image display means comprising an eyepiece adapted to be positioned in front of one eye of the user and to display video display information from said computer, and
        an audio output means comprising
            earphones, and
            a real-time text to speech conversion means adapted to receive speech data from said computer and to provide audio input to sound transducers in said earphones.

8. The information retrieval system of claim 7 wherein said carrying case further contains a memory card receiver adapted to read from and write to a memory card information transmitted via said I/O port means.

* * * * *